(12) United States Patent
Zhong et al.

(10) Patent No.: US 11,979,690 B2
(45) Date of Patent: May 7, 2024

(54) PHOSPHOR WHEEL, LIGHT SOURCE MODULE AND PROJECTOR

(71) Applicant: CHENGDU XGIMI TECHNOLOGY CO., LTD, Sichuan (CN)

(72) Inventors: Bo Zhong, Sichuan (CN); Shi Xiao, Sichuan (CN); Lei Yin, Sichuan (CN)

(73) Assignee: CHENGDU XGIMI TECHNOLOGY CO., LTD, Chengdu (CN)

( * ) Notice: Subject to any disclaimer, the term of this patent is extended or adjusted under 35 U.S.C. 154(b) by 166 days.

(21) Appl. No.: 17/599,576

(22) PCT Filed: Mar. 13, 2020

(86) PCT No.: PCT/CN2020/079140
§ 371 (c)(1),
(2) Date: Sep. 29, 2021

(87) PCT Pub. No.: WO2021/068455
PCT Pub. Date: Apr. 15, 2021

(65) Prior Publication Data
US 2022/0182587 A1 Jun. 9, 2022

(30) Foreign Application Priority Data
Oct. 10, 2019 (CN) .......................... 201910957030.4

(51) Int. Cl.
*F21S 10/00* (2006.01)
*G02B 26/00* (2006.01)
(Continued)

(52) U.S. Cl.
CPC .......... *H04N 9/3152* (2013.01); *F21S 10/007* (2013.01); *G02B 26/008* (2013.01); *G03B 21/204* (2013.01); *G03B 21/2066* (2013.01)

(58) Field of Classification Search
CPC .............. G03B 21/204; G03B 21/2066; G02B 26/008; F21S 10/007; H04N 9/3152
See application file for complete search history.

(56) References Cited

U.S. PATENT DOCUMENTS

| 2009/0027631 A1 | 1/2009 | Liu et al. |
| 2018/0095353 A1 | 4/2018 | Ishikawa |
| 2018/0188640 A1 | 7/2018 | Huang et al. |

FOREIGN PATENT DOCUMENTS

| CN | 104597698 A | * 5/2015 | ............ F21S 10/007 |
| CN | 205787560 | 12/2016 | |

(Continued)

OTHER PUBLICATIONS

Innovation Q+ NPL Search (Year: 2023).*
(Continued)

*Primary Examiner* — Anabel Ton
(74) *Attorney, Agent, or Firm* — East IP P.C.

(57) ABSTRACT

The present application relates to the field of projection technology and discloses a phosphor wheel, a light source module, and a projector. A phosphor wheel includes a base, a first phosphor layer, and a second phosphor layer. The base includes an excitation light reflecting section and an excitation light transmitting section. The first phosphor layer is disposed on a surface of the excitation light reflecting section facing a direction of incident light and spreading along a circumferential direction of the base. The second phosphor layer is disposed on a surface of the excitation light transmitting section facing away from the direction of incident light and spreading along a circumferential direction of the base. The first phosphor layer and the second phosphor layer are offset to each other in a radial direction of the base.

6 Claims, 9 Drawing Sheets

(51) Int. Cl.
  *G03B 21/20* (2006.01)
  *H04N 9/31* (2006.01)

(56) References Cited

FOREIGN PATENT DOCUMENTS

| | | | |
|---|---|---|---|
| CN | 104991407 B | 2/2017 | |
| CN | 106597785 A | 4/2017 | |
| CN | 206115130 | 4/2017 | |
| CN | 106681090 | 5/2017 | |
| CN | 106918008 | 7/2017 | |
| CN | 206431410 | 8/2017 | |
| CN | 107315311 | 11/2017 | |
| CN | 108732852 | 11/2018 | |
| CN | 208937891 U | 6/2019 | |
| CN | 110673328 | 1/2020 | |
| EP | 2544048 | 1/2013 | |
| JP | 2010086815 A | 4/2010 | |
| JP | 2011108535 A | 6/2011 | |
| JP | 2011128521 A | 6/2011 | |
| JP | 2015045778 A | 3/2015 | |
| JP | 2015045778 A * | 3/2015 | ........... G03B 21/204 |
| JP | 2016061945 | 4/2016 | |
| JP | 2016062012 | 4/2016 | |
| JP | 2018092137 A | 6/2018 | |

OTHER PUBLICATIONS

The Search Report for Japanese Application No. 2021-576766, dated Sep. 20, 2022, 38 pages.
The First Office Action for Japanese Application No. 2021-576766, dated Oct. 4, 2022, 15 pages.
The First Office Action for Australian Application No. 2020363580, dated Sep. 2, 2022, 3 pages.
International Search Report (with English Translation) and Written Opinion dated Jul. 8, 2020 in corresponding International Application No. PCT/CN2020/079140, 12 pages.
The First Office Action dated Aug. 11, 2020, in connection with corresponding Chinese Application No. 201910957030.4 (16 pages, including machine-generated English translation).
The First Office Action for Indian Application No. 202117041691, dated Nov. 2, 2022, 6 pages.
The Second Office Action for Australian Application No. 2020363580, dated Dec. 7, 2022, 3 pages.
The extended European search report dated Oct. 26, 2023 for European Application No. 20874624.8, 8 pages.
The Office Action dated Feb. 26, 2024 for New Zealand Application No. 780262, 5 pages.

* cited by examiner

PHOSPHOR WHEEL, LIGHT SOURCE MODULE AND PROJECTOR

CROSS-REFERENCE TO RELATED APPLICATIONS

This application is a National Stage of International Application No. PCT/CN2020/079140, filed on Mar. 13, 2020, which claims priority to Chinese Patent Application No. 201910957030.4, filed on Oct. 10, 2019, both of which are hereby incorporated by reference in their entireties.

TECHNICAL FIELD

This application relates to the field of projection technology, and in particular to a phosphor wheel, a light source module, and a projector.

BACKGROUND

In an existing projector, a phosphor wheel is used as a second light source. Phosphor is excited by excitation light to generate red light, green light, or yellow light. Existing phosphor wheels are generally categorized into transmitting phosphor wheels and reflective phosphor wheels. When energy of a light spot focused on the phosphor wheel is too high, a temperature of the phosphor wheel is too high, an efficiency of the phosphor is low, and even the phosphor on the phosphor wheel may be burned. When the light spot focused on the phosphor wheel enlarges, the temperature of the phosphor is low, and luminous flux of the excited phosphor light is high. However, due to the limitation of etendue in the projector system, the utilization efficiency of the excited phosphor light in the system is reduced, so there is an optimal light spot size.

SUMMARY

Embodiments of the present application provide a phosphor wheel, a light source module, and a projector, to improve the problem of low efficiency of phosphor caused by overly high light source energy.

In a first aspect, the embodiments of the present application provide a phosphor wheel including a base, a first phosphor layer, and a second phosphor layer, and the base includes an excitation light reflecting section and an excitation light transmitting section.

The first phosphor layer is disposed on a surface of the excitation light reflecting section facing a direction of incident light and spreads along a circumferential direction of the base.

The second phosphor layer is disposed on a surface of the excitation light transmitting section facing away from the direction of incident light and spreads along the circumferential direction of the base.

The first phosphor layer and the second phosphor layer are offset to each other in a radial direction of the base.

In the above technical solution, the surface of the excitation light reflecting section facing the direction of incident light is provided with the first phosphor layer, and the surface of the excitation light transmitting section facing away from the direction of incident light is provided with the second phosphor layer, and the first phosphor layer and the second phosphor layer are offset to each other in the radial direction of the base. Therefore, when the excitation light irradiates the phosphor wheel, a part of the excitation light irradiates the first phosphor layer and excites the first excited phosphor light, and a part of the excitation light passes through the excitation light transmitting section, irradiates the second phosphor layer and excites the second excited phosphor light. That is, a part of the light spot irradiated by the excitation light on the phosphor wheel is located in the excitation light reflecting section and excites the first excited phosphor light, and a part of the light spot is located in the excitation light transmitting section and excites the second excited phosphor light, so as to effectively reduces the temperature of the phosphor wheel and improve the efficiency of the phosphor. At the same time, spot sizes in the transmitting region and the reflecting region both meet the optimal spot size of the system. After passing through a light-combining optical path such as a lens, the second excited phosphor light excited by transmission and the first excited phosphor light excited by reflection are combined into one optical path, so that the excitation efficiency can be about doubled.

In some embodiments of the present application, the base includes a reflecting layer and a transmitting layer.

The reflecting layer and the transmitting layer are stacked, a portion of the transmitting layer covered by the reflecting layer is the excitation light reflecting section or the reflecting layer is the excitation light reflecting section, and a portion of the transmitting layer not covered by the reflecting layer is the excitation light transmitting section.

In the above technical solution, the reflecting layer and the transmitting layer are stacked, the structure is simple, and the assembly is easy. In addition, this structure can increase the axial distance between the first phosphor layer and the second phosphor layer, which helps to reduce the temperature of the phosphor wheel.

In some embodiments of the present application, the transmitting layer extends beyond the edge of the reflecting layer, and the second phosphor layer is disposed on a portion of the transmitting layer extending beyond the reflecting layer.

In the above technical solution, the second phosphor layer is disposed on the portion of the transmitting layer extending beyond the reflecting layer, so that the second phosphor layer is not blocked by the reflecting layer, and the excitation light can more easily excite the second phosphor layer.

In some embodiments of the present application, the base includes a reflecting layer and a transmitting layer.

The transmitting layer is ring-shaped, the transmitting layer is sleeved on an outer periphery of the reflecting layer, the reflecting layer is the excitation light reflecting section, and the transmitting layer is the excitation light transmitting section.

In the above technical solution, the transmitting layer is ring-shaped, and the transmitting layer is sleeved on the outer periphery of the reflecting layer, which can effectively reduce the volume of the phosphor wheel.

In some embodiments of the present application, a filter layer is disposed on the transmitting layer.

The filter layer is configured to transmit excitation light and reflect phosphor light excited from the second phosphor layer.

In the above technical solution, a filter layer is provided on the transmitting layer, and the filter layer can reflect the phosphor light excited from the second phosphor layer to prevent the phosphor light from being emitted to the surroundings.

In some embodiments of the present application, a projection area of the second phosphor layer in an axial direction of the phosphor wheel is contained in the filter layer.

In the above technical solution, the projection area of the second phosphor layer in the axial direction of the phosphor wheel is contained in the filter layer, and the filter layer can reflect more phosphor light, so that the phosphor light can be emitted more concentratedly in the specified direction.

In some embodiments of the present application, the filter layer is a coating film disposed on the transmitting layer.

In the above technical solution, the filter layer on the transmitting layer is a coating film, the molding process of the filter layer is simple, and filter layer is easy to the mold and manufacture.

In some embodiments of the present application, a spread path of the first phosphor layer and a spread path of the second phosphor layer are both ring-shaped, the first phosphor layer and the second phosphor layer are coaxially disposed, and an outer diameter of the first phosphor layer is equal to an inner diameter of the second phosphor layer.

In the above technical solution, the outer diameter of the first phosphor layer is equal to the inner diameter of the second phosphor layer. That is, the outer contour of the first phosphor layer is aligned with the inner contour of the second phosphor layer, so that the first phosphor layer and the second phosphor layer can make full use of the excitation light.

In some embodiments of the present application, the excitation light reflecting section is provided with a transmitting portion for the excitation light to pass through.

In the above technical solution, the excitation light reflecting section is provided with a transmitting portion. The excitation light that excites the first phosphor layer can pass through the transmitting portion, and the excitation light that passes through the transmitting portion can be used for light compensation.

In some embodiments of the present application, the excitation light reflecting section is provided with a reflecting structure.

Reflected light of the excitation light irradiating the first phosphor layer is at an included angle with reflected light of the excitation light irradiating the reflecting structure along a same incident direction.

In the above technical solution, the excitation light reflecting section is provided with a reflecting structure. The reflecting structure can reflect the excitation light, and the excitation light reflected by the reflecting structure can be used for light compensation.

In some embodiments of the present application, the reflecting structure includes a first reflector or diffuse reflective particles.

In the above technical solution, the reflecting structure is a first reflector or diffuse reflective particles, which has a simple structure and is easy to implement.

In a second aspect, the embodiments of the present application provide a light source module, which includes a first light source, a light combining system, and a phosphor wheel.

The phosphor wheel includes a base, a first phosphor layer, and a second phosphor layer, the base includes an excitation light reflecting section and an excitation light transmitting section. The first phosphor layer is disposed on a surface of the excitation light reflecting section facing a direction of incident light and spreads along a circumferential direction of the base. The second phosphor layer is disposed on a surface of the excitation light transmitting section facing away from the direction of incident light and spreads along the circumferential direction of the base. The first phosphor layer and the second phosphor layer are offset to each other in a radial direction of the base.

A part of excitation light emitted by the first light source irradiates the first phosphor layer and excites the first excited phosphor light, and a part of the excitation light emitted by the first light source passes through the excitation light transmitting section, irradiates the second phosphor layer and excites second excited phosphor light.

The light combining system is configured to combine the first excited phosphor light and the second excited phosphor light.

In the above technical solution, a part of the excitation light emitted by the first light source irradiates the first phosphor layer and excites the first excited phosphor light, and a part of the excitation light emitted by the second light source passes through the excitation light transmitting section, irradiates the second phosphor layer and excites the second excited phosphor light. The first excited phosphor light and the second excited phosphor light are combined through the light combining system, which effectively reduces the temperature of the phosphor wheel, improves the efficiency of the phosphor, and the light efficiency of the system can be effectively improved.

In some embodiments of the present application, the light combining system includes a first converging and shaping lens group, a dichroic reflector, a prism, a second converging and shaping lens group, a color filter wheel, a light pipe, and an optical path turning lens group. The first excited phosphor light sequentially passes through the first converging and shaping lens group, the dichroic reflector, the prism, the second converging and shaping lens group and the color filter color wheel, and enters the light pipe.

The second excited phosphor light sequentially passes through the optical path turning lens group, the prism, the second converging and shaping lens group and the color filter wheel, and enters the light pipe.

In the above technical solution, the first excited phosphor light excited from the first phosphor layer is reflected by the excitation light reflecting section and then enters the first converging and shaping lens group. After the first excited phosphor light is converged and shaped by the first converging and shaping lens group, the first excited phosphor light passes through the dichroic reflector and enters the prism. After the first excited phosphor light passes through the prism, the first excited phosphor light is converged and shaped by the second converging and shaping lens group again. After the color of the first excited phosphor light is filtered by the color filter wheel, the first excited phosphor light finally enters the light pipe for homogenization.

The second excited phosphor light excited from the second phosphor layer pass through the optical path turning lens group where its optical path is changed, and enters the prism. The second excited phosphor light is totally reflected by the prism and then enters the second converging and shaping lens group. The second excited phosphor light is converged and shaped by the second converging and shaping lens group again. After the color of the first excited phosphor light is filtered by the color filter wheel, the first excited phosphor light finally enters the light pipe for homogenization.

In some embodiments of the present application, the light source module further includes a second light source, and excitation light emitted by the second light source sequentially passes through the dichroic reflector, the prism, the second converging and shaping lens group, and the color filter wheel, and enters the light pipe.

In the above technical solution, the excitation light emitted by the second light source sequentially passes through the dichroic reflector, the prism, the second converging and shaping lens group, and the color filter wheel, and enters the light pipe. The second light source is provided to compensate the excitation light.

In some embodiments of the present application, the excitation light reflecting section is provided with a transmitting portion for the excitation light to pass through.

The excitation light emitted by the first light source passes through the transmitting portion and sequentially passes through the optical path turning lens group, the prism, the second converging and shaping lens group, and the color filter wheel, and enters the light pipe.

In the above technical solution, the excitation light emitted by the first light source passes through the transmitting portion, the optical path turning lens group, the prism, the second converging and shaping lens group, and the color filter color wheel, and enters the light pipe, to compensate the excitation light.

In some embodiments of the present application, the excitation light reflecting section is provided with a reflecting structure. Reflected light of the excitation light irradiating the first phosphor layer is at an included angle with reflected light of the excitation light irradiating the reflecting structure along a same incident direction.

The light source module further includes a second reflector.

The reflected light generated when the excitation light emitted by the first light source irradiates the reflecting structure sequentially passes through the second reflector, the dichroic reflector, the prism, the second converging and shaping lens group, and the color filter wheel, and enters the light pipe.

In the above technical solution, the reflected light generated when a part of the excitation light emitted by the first light source irradiates the reflecting structure sequentially passes through the second reflector, the dichroic reflector, the prism, the second converging and shaping lens group, and the color filter wheel, and enters the light pipe, to compensate the excitation light.

In some embodiments of the present application, the light source module further includes an entrance optical system.

The entrance optical system includes a focusing and collimating lens group and a diffusing sheet. The excitation light emitted by the first light source sequentially passes through the focusing and collimating lens group, the diffusing sheet, the dichroic reflector, and the first converging and shaping lens group, and irradiates the phosphor wheel.

In the above technical solution, the excitation light emitted by the first light source is focused and collimated by the focusing and collimating lens group and then homogenized by the diffusing sheet, passes through the dichroic reflector, enters the first converging and shaping lens group, and the excitation light emitted by the first light source is converged and shaped by the converging and shaping lens group and irradiates the phosphor wheel. After the excitation light is converged by the first converging and shaping lens group, a light spot of a suitable size can be obtained. The size of the light spot can be twice the optimal light spot, half of the light spot is focused on the first phosphor layer, and the other half of the light spot is focused on the second phosphor layer.

In a third aspect, the embodiments of the present application provide a projector including the light source module according to the embodiment in the second aspect.

In the above technical solution, the projector includes the above light source module, which effectively reduces the temperature of the phosphor wheel, improves the efficiency of the phosphor, and the light efficiency of the system can be effectively improved.

BRIEF DESCRIPTION OF THE DRAWINGS

The drawings required to describe embodiments of the present application are introduced briefly below to illustrate technical solutions of the embodiments of the present application more clearly. It should be understood that the drawings described below only show some embodiments of the present application, and thus should not be regarded as a limitation of the scope. For those ordinary skilled in the art, other related drawings may be obtained from these drawings without any creative work.

Figure 1:
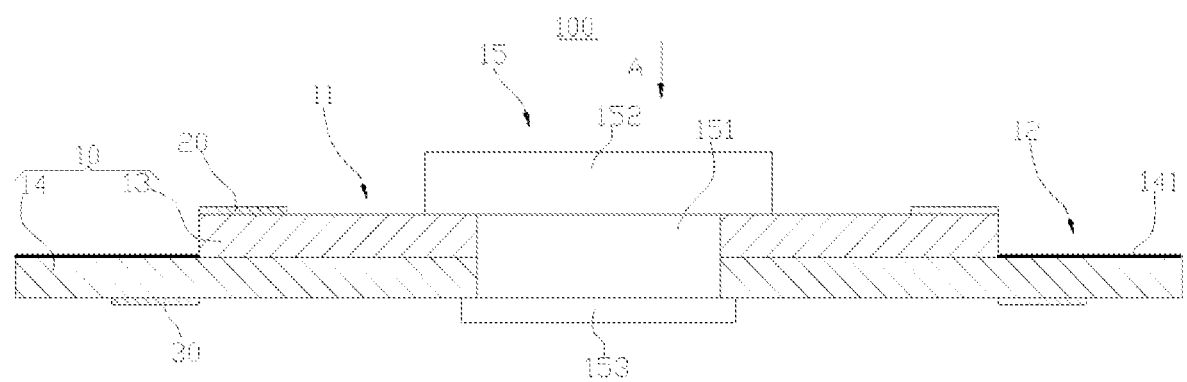
FIG. 1 is a first possible schematic structural diagram of a phosphor wheel according to Embodiment 1 of the present application.

Reference signs: 100—phosphor wheel; 10—base; 11—excitation light reflecting section; 111—transmission section; 112—reflecting structure; 12—excitation light transmitting section; 13—reflecting layer; 14—transmitting layer; 141—filter layer; 15—connecting member; 151—shaft portion; 152—first limiting portion; 153—second limiting portion; 16—bottom layer; 20—first phosphor layer; 30—second phosphor layer; 200—light source module; 210—first light source; 220—light combining system; 221—first converging and shaping lens group; 2211—first plano-convex lens; 2212—first biconvex lens; 222—dichroic reflector; 223—prism; 224—second converging and shaping lens group; 2241—second biconvex lens; 225—color filter wheel; 226—light pipe; 227—optical path turning lens group; 2271—second plano-convex lens; 2272—third biconvex lens; 2273—third reflector; 2274—fourth reflector; 2275—fourth biconvex lens; 2276—fifth reflector; 228—reflector; 2281—transmitting film; 2282—reflecting film; 230—entrance optical system; 231—focusing and collimating lens group; 2311—third plano-convex lens; 2312—plano-concave lens; 232—diffusion sheet; 240—second light source; 250—second reflector.

DETAILED DESCRIPTION

In order to make the objects, technical solutions and advantages of the embodiments of the present application more clear, the technical solutions in the embodiments of the present application will be described clearly and completely in conjunction with the drawings in the embodiments of the present application. Obviously, the described embodiments are a part of the embodiments of the present application, but not all of the embodiments. The components of the embodiments of the present application generally described and shown in the drawings herein may be arranged and designed in various different configurations.

Therefore, the following detailed description of the embodiments of the present application provided in the drawings is not intended to limit the scope of the claimed application, but merely represents the selected embodiments of the present application. Based on the embodiments in the present application, all other embodiments obtained by those ordinary skilled in the art without any creative work shall fall within the protection scope of the present application.

It should be noted that the embodiments in the present application and the features in the embodiments could be combined with each other if there is no conflict.

It should be noted that similar reference numbers and letters indicate similar items in the following drawings. Therefore, once a certain item is defined in one drawing, it does not need to be further defined and explained in the subsequent drawings.

It should be noted that, in the description of the embodiments of the present application, the indicated orientation or positional relationship may be the orientation or positional relationship shown in the drawings, or may be the orientation or positional relationship of the product of the present application when the product is being used, or may be the orientation or positional relationship commonly understood by those ordinary skilled in the art, or may be the orientation or positional relationship of the product of the present application when the product is being used. Further, the indicated orientation or positional relationship is only for the convenience of describing the present application and simplifying the description, and does not indicate or imply that the described device or element must have a specific orientation or must be constructed and operated in a specific orientation, and thus cannot be understood as a limitation of the present application. In addition, the terms "first", "second", "third" and the like are only used for distinguishing descriptions, and cannot be understood as indicating or implying relative importance.

Embodiment 1

Figure 2:
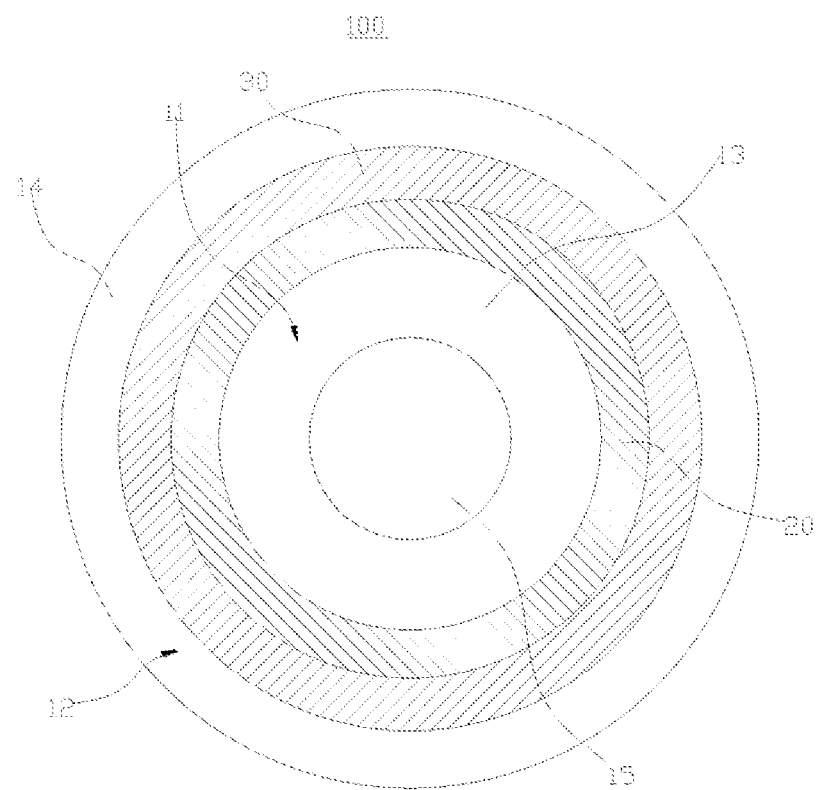
FIG. 2 is a view illustrated along a direction A as shown in FIG. 1.

As shown in FIG. 1 and FIG. 2, this embodiment provides a phosphor wheel 100, which includes a base 10, a first phosphor layer 20, and a second phosphor layer 30. The base 10 includes an excitation light reflecting section 11 and an excitation light transmitting section 12. The first phosphor layer 20 is disposed on a surface of the excitation light reflecting section 11 facing a direction of incident light and spreads along a circumferential direction of the base 10. The second phosphor layer 30 is disposed on a surface of the excitation light transmitting section 12 facing away from the direction of incident light and spreads along a circumferential direction of the base 10. The first phosphor layer 20 and the second phosphor layer 30 are offset to each other in a radial direction of the base 10.

When the excitation light irradiates the phosphor wheel 100, a part of the excitation light irradiates the first phosphor layer 20 and excites the first excited phosphor light, and a part of the excitation light passes through the excitation light transmitting section 12, irradiates the second phosphor layer 30 and excites the second excited phosphor light. That is, a part of the light spot irradiated by the excitation light on the phosphor wheel 100 is located in the excitation light reflecting section 11 and excites the first excited phosphor light, and a part of the light spot is located in the excitation light transmitting section 12 and excites the second excited phosphor light, which solves the problem that the temperature of the phosphor wheel 100 is overly high because of the overly high energy of the light spot, and improves the efficiency of the phosphor. In addition, the first excited phosphor light and the second excited phosphor light may be combined by the light combining system, which can effectively improve the light efficiency.

It should be noted that, the excitation light reflecting section 11 is the part of the base that can reflect the excitation light, and the excitation light transmitting section 12 is the region of the base 10 that can transmit the excitation light.

The first phosphor layer 20 is phosphor coated on the excitation light reflecting section 11, and the phosphor in the first phosphor layer 20 may be of one or multiple colors. If the phosphor in the first phosphor layer 20 is of multiple colors, such as red, yellow, and green, the first phosphor layer 20 can be divided into three regions, and each region corresponds to phosphor of one color.

The second phosphor layer 30 is phosphor coated on the excitation light transmitting section 12, and the phosphor in the second phosphor layer 30 may be of one color or multiple colors. If the phosphor in the second phosphor layer 30 are of multiple colors, such as red, yellow, and green, the second phosphor layer 30 can be divided into three regions, and each region corresponds to phosphor of one color.

In this embodiment, both of the first phosphor layer 20 and the second phosphor layer are phosphor of three colors including red, yellow, and green, and regions of same colors in the first phosphor layer 20 and the second phosphor layer 30 are corresponding.

The phosphor light can be excited by irradiating either of the first phosphor layer 20 and the second phosphor layer 30 by the excitation light. The excitation light may be blue laser, ultraviolet light, or the like. In this embodiment, for example, the excitation light is a blue laser.

Further, still referring to FIG. 1, the base 10 includes a reflecting layer 13 and a transmitting layer 14. The reflecting layer 13 and the transmitting layer 14 are stacked, a portion of the transmitting layer 14 covered by the reflecting layer 13 is the excitation light reflecting section 11 or the reflecting layer 13 is the excitation light reflecting section 11, and a portion of the transmitting layer 14 not covered by the reflecting layer 13 is the excitation light transmitting section 12.

The reflecting layer 13 and the transmitting layer 14 are stacked, the structure is simple, and the assembly is easy. In addition, this structure can increase the axial distance between the first phosphor layer 20 and the second phosphor layer 30, which helps to reduce the temperature of the phosphor wheel 100.

In this embodiment, the reflecting layer 13 and the transmitting layer 14 are both plate-shaped structures, and the reflecting layer 13 and the transmitting layer 14 can be made of multiple materials. For example, the reflecting layer 13 is an aluminum base, and the transmitting layer 14 is a sapphire base.

In this embodiment, the reflecting layer 13 is located on the upper side of the transmitting layer 14, and the reflecting layer 13 is the excitation light reflecting section 11.

In this case, the surface of the excitation light reflecting section 11 facing the direction of incident light is the surface of the reflecting layer 13 away from the transmitting layer 14 in the thickness direction, and the surface of the excitation light transmitting section 12 facing away from the direction of incident light is the surface of the part of the transmitting layer 14 not covered by the reflecting layer 13 which surface is far away from the surface of the reflecting layer 13 in the thickness direction. The surface of the excitation light transmitting section 12 facing the direction of incident light is the surface of the part of the transmitting layer 14 not covered by the reflecting layer 13 which surface is close to the reflecting layer 13 in the thickness direction. It can be understood that, the first phosphor layer 20 is provided on the surface of the reflecting layer 13 away from the transmitting layer 14, and the second phosphor layer 30 is provided on the surface of the transmitting layer 14 away from the reflecting layer 13.

Figure 3:
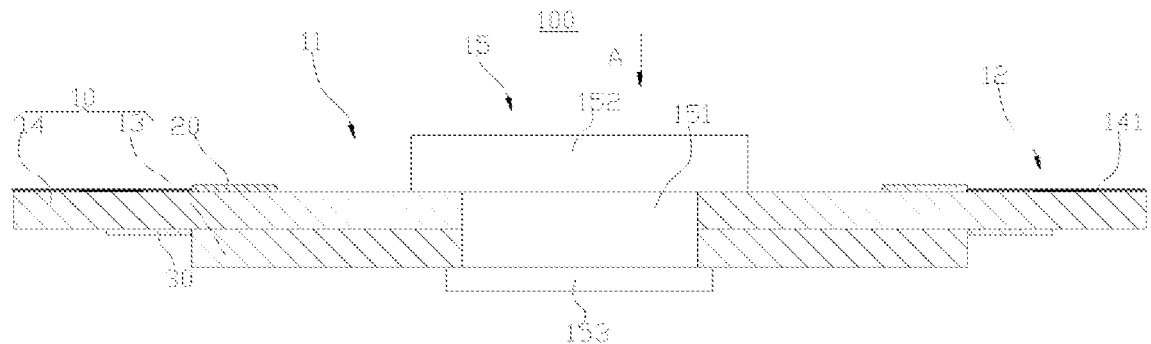
FIG. 3 is a second possible schematic structural diagram of a phosphor wheel according to Embodiment 1 of the present application.

Of course, as shown in FIG. 3, the reflecting layer 13 may also be located on the lower side of the transmitting layer 14, and the portion of the transmitting layer 14 covered by the reflecting layer 13 is the excitation light reflecting section 11. It can be understood that, the first phosphor layer 20 is provided on the surface of the transmitting layer 14 away from the reflecting layer 13, and the second phosphor layer 30 is provided on the surface of the transmitting layer 14 close to the reflecting layer 13.

Optionally, still referring to FIG. 1, the transmitting layer 14 extends beyond the edge of the reflecting layer 13, and the second phosphor layer 30 is disposed on a portion of the transmitting layer 14 extending beyond the reflecting layer 13. The second phosphor layer 30 is disposed on the portion of the transmitting layer 14 extending beyond the reflecting layer 13, so that the second phosphor layer 30 is not blocked by the reflecting layer 13, and the excitation light can more easily excite the second phosphor layer 30.

The arrangement path of the transmitting layer 14 and the arrangement path of the reflecting layer 13 are both ring-shaped, and the transmitting layer 14 and the reflecting layer 13 are coaxially arranged. The outer diameter of the reflecting layer 13 is smaller than the outer diameter of the transmitting layer 14. The portion of the transmitting layer 14 extending beyond the edge of the reflecting layer 13 (the portion of the transmitting layer 14 not covered by the reflecting layer 13) is also ring-shaped.

In this embodiment, the transmitting layer 14 and the reflecting layer 13 are connected by the connecting member 15. The connecting member 15 includes a shaft portion 151, a first limiting portion 152, and a second limiting portion 153. The first limiting portion 152 and the second limiting portion 153 are respectively connected to two ends of the shaft portion 151. The transmitting layer 14 and the reflecting layer 13 are both sleeved on the outer side of the shaft portion 151. The transmitting layer 14 and the reflecting layer 13 are restricted between the first limiting portion 152 and the second limiting portion 153. In other embodiments, the transmitting layer 14 and the reflecting layer 13 may be connected in other manners, for example, the the transmitting layer 14 and the reflecting layer 13 are glued together.

In addition to the function of connecting the transmitting layer 14 and the reflecting layer 13, the connecting member 15 may be configured to be connected with a motor, so that the entire phosphor wheel 100 may be driven to rotate by the motor.

Figure 4:
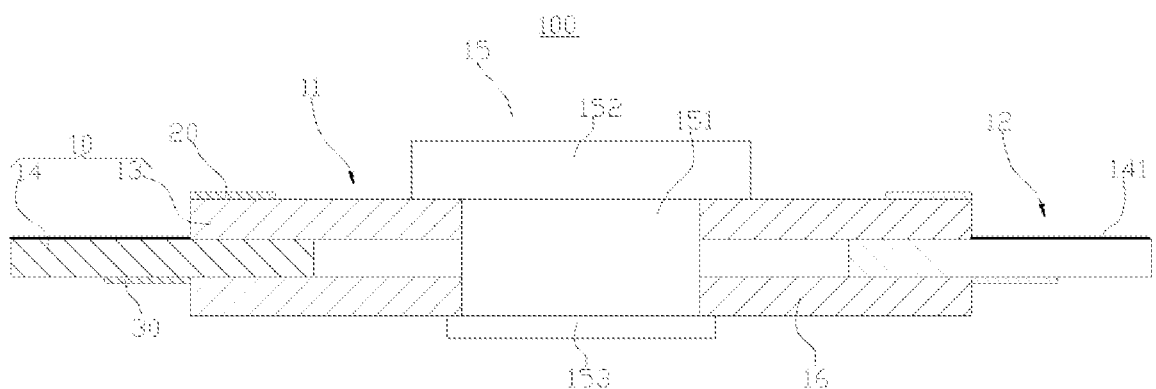
FIG. 4 is a third possible schematic structural diagram of a phosphor wheel according to Embodiment 1 of the present application.

Of course, the base 10 may have other structures. For example, as shown in FIG. 4, the base 10 may include a bottom layer 16 besides the transmitting layer 14 and the reflecting layer 13. The reflecting layer 13, the transmitting layer 14 and the bottom layer are stacked in order. The reflecting layer 13, the transmitting layer 14, and the bottom layer 16 are all sleeved on the outside of the shaft portion 151 of the connecting member 15. The transmitting layer 14, the reflecting layer 13, and the bottom layer 16 are restricted between the first limiting portion 152 and the second limiting portion 153 of the connecting member 15. For example, the bottom layer 16 is an aluminum base the same size as the reflecting layer 13.

Further, still referring to FIG. 1, the first phosphor layer 20 and the second phosphor layer 30 are both ring-shaped, the first phosphor layer 20 and the second phosphor layer 30 are coaxially arranged, and the outer diameter of the first phosphor layer 20 is equal to the inner diameter of the second phosphor layer 30. The outer contour of the first phosphor layer 20 is aligned with the inner contour of the second phosphor layer 30, so that the first phosphor layer and the second phosphor layer 30 can make full use of the excitation light.

It should be noted that, the first phosphor layer 20 and the second phosphor layer 30 are arranged coaxially. The outer diameter of the first phosphor layer 20 is equal to the inner diameter of the second phosphor layer 30. That is, the first phosphor layer 20 and the second phosphor layer 30 are completely staggered in the radial direction of the base 10.

Optionally, as shown in FIG. 1, a filter layer 141 is provided on the transmitting layer 14, and the filter layer 141 is configured to transmit excitation light and reflect the fluorescence excited from the second phosphor layer 30. In this embodiment, the filter layer 141 is provided on the surface of the transmitting layer 14 close to the reflecting layer 13. In other embodiments, the filter layer 141 may be provided on the surface of the transmitting layer 14 away from the reflecting layer 13. In this case, the filter layer 141 is located between the transmitting layer 14 and the second phosphor layer 30.

Optionally, a projection area of the second phosphor layer 30 in the axial direction of the phosphor wheel 100 is contained in the filter layer 141. This structure enables the filter layer 141 to reflect more phosphor light, so that the phosphor light can be emitted more concentratedly in a specified direction.

Still referring to FIG. 1, when the excitation light irradiates the phosphor wheel 100, the excitation light sequentially passes through the filter layer 141 and the transmitting layer 14, irradiates the second phosphor layer 30 and excites phosphor light. The filter layer 141 can reflect the excited fluorescence, and prevent the phosphor light from being emitted to the surroundings.

Of course, because the second phosphor layer 30 is arranged on the surface of the excitation light transmitting section 12 facing away from the direction of incident light, the arrangement of the filter layer 141 makes the phosphor light excited from the second phosphor layer 30 controllable and prevents the phosphor light from being emitted to the surroundings. If the second phosphor layer 30 is arranged on the surface of the excitation light transmitting section 12 facing the direction of incident light, the light will be uncontrollable and will be emitted to the surroundings.

Optionally, the filter layer 141 is a coating film disposed on the surface of the transmitting layer 14 close to the reflecting layer 13, and the molding process of the filter layer 141 is simple and the filter layer 141 is easy to be molded and manufactured.

Figure 5:
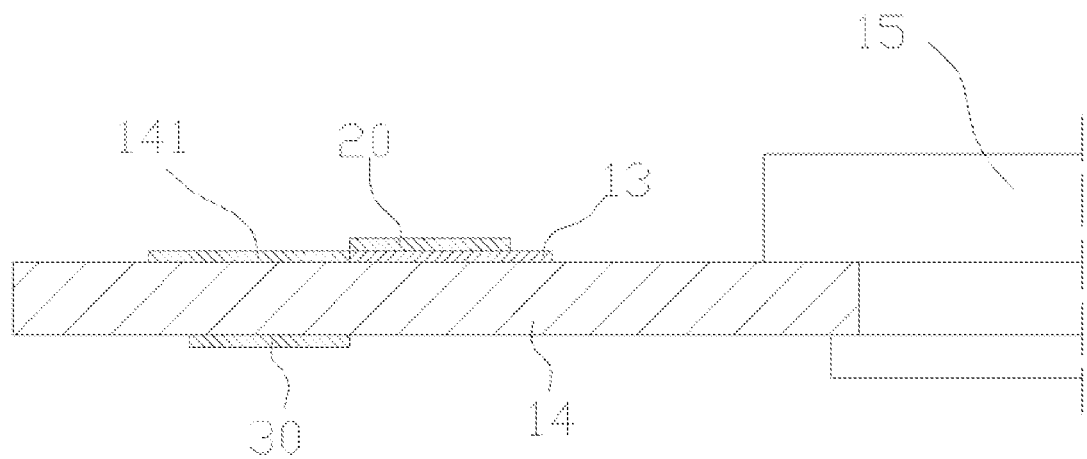
FIG. 5 is a fourth possible schematic structural diagram of a phosphor wheel according to Embodiment 1 of the present application.

In this embodiment, the reflecting layer 13 has a thicker laminate structure. Of course, as shown in FIG. 5, the reflecting layer 13 may also be a coating provided on the transmitting layer 14. The coating can reflect both excitation light and fluorescent light.

Embodiment 2

Figure 6:
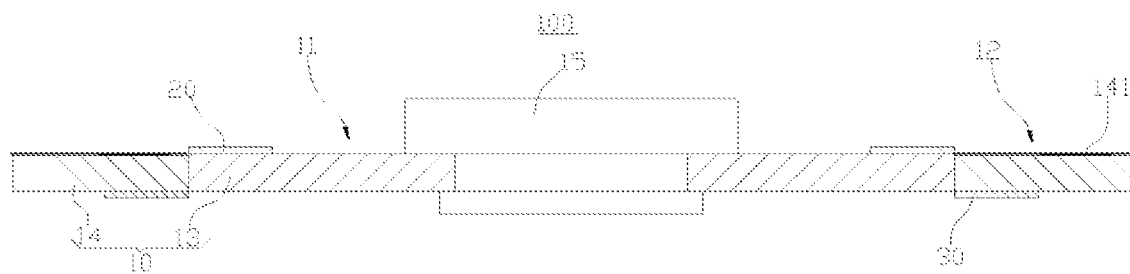
FIG. 6 is a schematic structural diagram of a phosphor wheel according to Embodiment 2 of the present application.

As shown in FIG. 6, this embodiment provides a phosphor wheel 100. This embodiment is different from Embodiment 1 in that the transmitting layer 14 and the reflecting layer 13 of the base 10 are differently arranged.

In this embodiment, the transmitting layer 14 of the base 10 is ring-shaped, and the transmitting layer 14 is sleeved on the outer periphery of the transmitting layer 14. In this case, the reflecting layer 13 is the excitation light reflecting section 11, and the transmitting layer 14 is the excitation light transmitting section 12.

In this embodiment, the reflecting layer 13 and the transmitting layer 14 are both plate-shaped structures, and the reflecting layer 13 and the transmitting layer 14 can be made of multiple materials. For example, the reflecting layer 13 is an aluminum base, and the transmitting layer 14 is a sapphire base.

The surface of the excitation light reflecting section 11 facing the direction of incident light is the upper surface of the reflecting layer 13, and the surface of the excitation light reflecting section 11 facing away from the direction of incident light is the lower surface of the reflecting layer 13. The surface of the excitation light transmitting section 12 facing the direction of incident light is the upper surface of the transmitting layer 14, and the surface of the excitation light transmitting section 12 facing away from the direction of incident light is the lower surface of the transmitting layer 14.

The reflecting layer 13 and the transmitting layer 14 may be connected in various ways. For example, the reflecting layer 13 and the transmitting layer 14 are connected together by bonding.

In this embodiment, the reflecting layer 13 is also ring-shaped, and a connecting member 15 is provided at the center of the reflecting layer 13, which is configured to be connected with the motor. The thickness of the reflecting layer 13 is consistent with the thickness of the transmitting layer 14, and the upper surface of the reflecting layer 13 is level with the upper surface of the transmitting layer 14.

Further, the first phosphor layer 20 and the second phosphor layer 30 are both ring-shaped. The first phosphor layer 20 and the second phosphor layer 30 are coaxially arranged. The outer diameter of the first phosphor layer 20 is equal to the inner diameter of the second phosphor layer 30.

Optionally, a filter layer 141 is provided on the transmitting layer 14, and the filter layer 141 is configured to transmit excitation light and reflect the phosphor light excited from the second phosphor layer.

In this embodiment, the filter layer 141 is provided on the upper surface of the transmitting layer 14. In other embodiments, the filter layer may be provided on the lower surface of the transmitting layer 14. In this case, the filter layer 141 is located between the transmitting layer 14 and the second phosphor layer 30.

Optionally, a projection area of the second phosphor layer 30 in the axial direction of the phosphor wheel 100 is contained in the filter layer 141. This structure enables the filter layer 141 to reflect more phosphor light, so that the phosphor light can be emitted more concentratedly in a specified direction.

Optionally, the filter layer 141 is a coating film disposed on the surface of the transmitting layer 14 close to the reflecting layer 13, and the molding process of the filter layer 141 is simple and the filter layer 141 is easy to be molded and manufactured.

In this embodiment, the transmitting layer 14 is sleeved on the outer side of the reflecting layer 13. In other embodiments, the reflecting layer 13 may be sleeved on the outer side of the transmitting layer 14.

Embodiment 3

Figure 7:
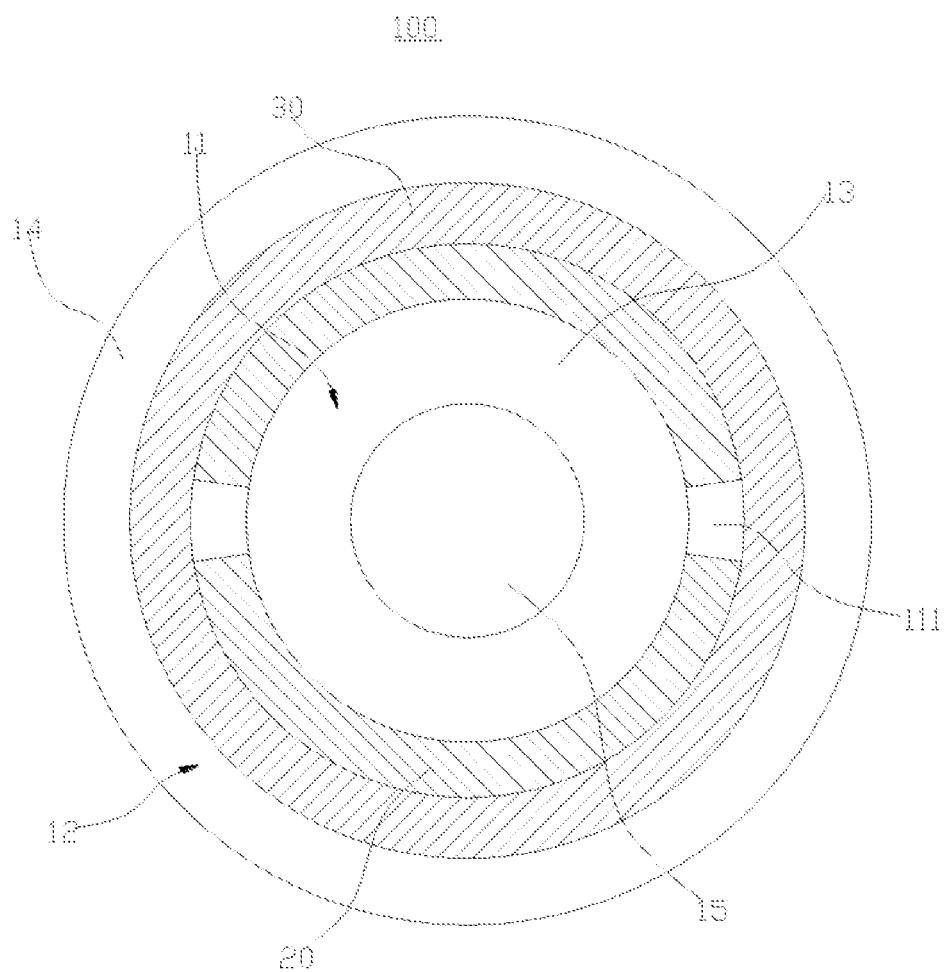
FIG. 7 is a schematic structural diagram of a phosphor wheel according to Embodiment 3 of the present application.

As shown in FIG. 7, this embodiment provides a phosphor wheel 100. This embodiment is different from Embodiment 1 in that the excitation light reflecting section 11 is provided with a transmitting portion 111 for the excitation light to pass through.

During the rotation of the phosphor wheel 100, the excitation light that excites the first phosphor layer 20 can intermittently pass through the transmitting portion 111, and the excitation light that passes through the transmitting portion 111 can be used for light compensation.

In this embodiment, the transmissive portion 111 is a light-transmitting hole opened on the transmitting layer 14 of the base 10. There may be one, two or more light-transmitting holes. For example, there are two light-transmitting holes, and the two light-transmitting holes are symmetric about the center axis of the base 10.

Of course, the excitation light reflecting section 11 of the phosphor wheel 100 according to Embodiment 2 may be provided with a transmitting portion 111 for the excitation light to pass through.

Embodiment 4

Figure 8:
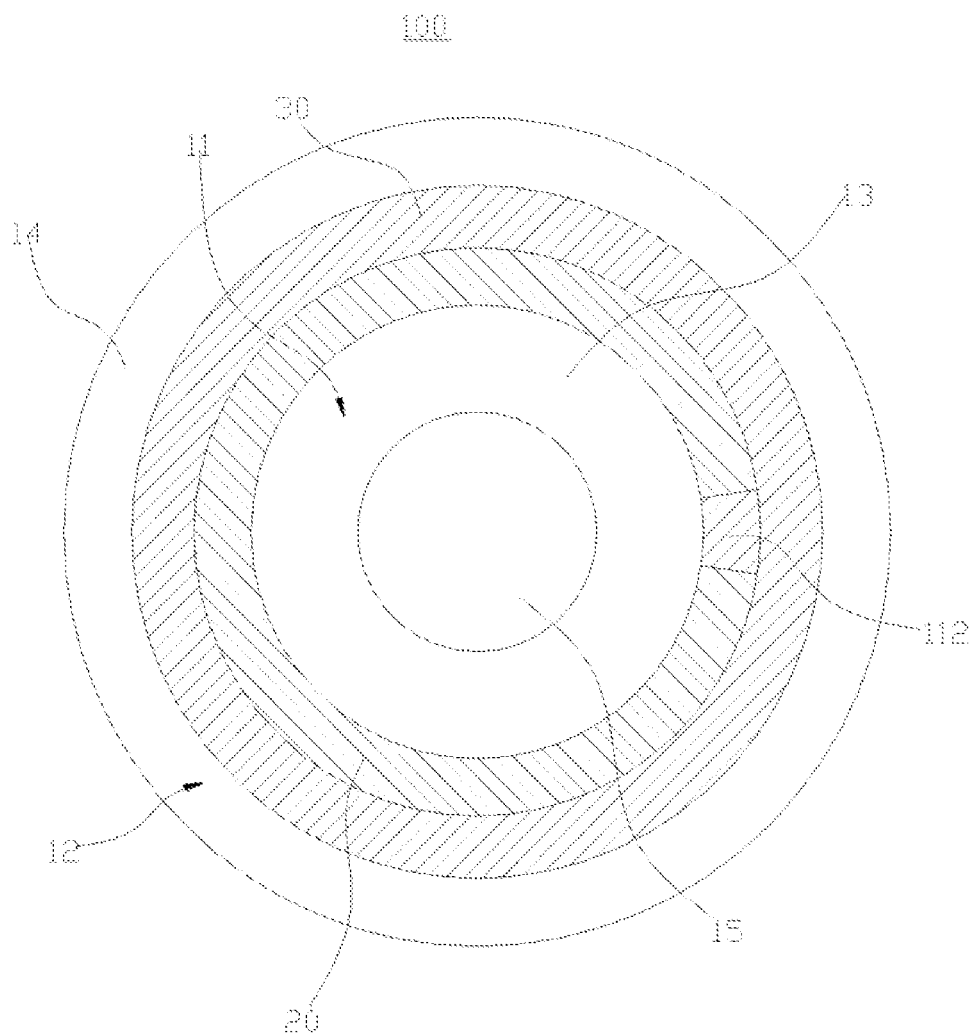
FIG. 8 is a schematic structural diagram of a phosphor wheel according to Embodiment 4 of the present application.

As shown in FIG. 8, this embodiment provides a phosphor wheel 100. This embodiment is different from Embodiment 1 in that the excitation light reflecting section 11 is provided with a reflecting structure 112. Reflected light of the excitation light irradiating the first phosphor layer 20 is at an included angle with reflected light of the excitation light irradiating the reflecting structure 112 along a same incident direction.

The reflecting structure 112 may be a first reflector or diffuse reflection particles or the like provided on the reflecting layer 13.

During the rotation of the phosphor wheel 100, the excitation light that excites the first phosphor layer 20 may irradiate the reflecting structure 112 intermittently, and the excitation light reflected by the reflecting structure 112 may be used for light compensation.

Of course, the reflecting structure 112 may be provided in the excitation light reflecting section 11 of the phosphor wheel 100 according to Embodiment 2.

In other embodiments, both of the reflecting structure 112 and the transmitting portion 111 may be provided in the excitation light reflecting section 11.

Embodiment 5

As shown in FIG. 9 to FIG. 12, this embodiment provides a light source module 200, which includes a first light source 210, a light combining system 220, and the phosphor wheel 100 according to any one of the foregoing embodiments.

The first light source 210 is configured to provide excitation light for the phosphor wheel 100. A part of excitation light emitted by the first light source 210 irradiates the first phosphor layer 20 and excites the first excited phosphor light, and a part of the excitation light emitted by the first light source 210 passes through the excitation light transmitting section 12, irradiates the second phosphor layer 30 and excites second excited phosphor light. The light combining system 220 is configured to combine the first excited phosphor light and the second excited phosphor light.

A part of the excitation light emitted by the first light source 210 irradiates the first phosphor layer 20 and excites the first excited phosphor light. A part of the excitation light emitted by the second light source 240 passes through the excitation light transmission region 12, irradiates the second phosphor layer 30, and excites the second excited phosphor light. The first excited phosphor light and the second excited phosphor light are combined by the light combining system 220. The temperature of the phosphor wheel 100 is effectively reduced, the efficiency of the phosphor is improved, and the light efficiency of the system can be effectively improved.

The first light source 210 may be a blue laser light source, an ultraviolet light source, or an LED light source lamp. In this embodiment, the first light source 210 is a blue laser light source, and the excitation light emitted by the first light source 210 is a blue laser.

The function of the light combining system 220 is to combine the first excited phosphor light and the second excited phosphor light. In this embodiment, the light combining system 220 includes a first converging and shaping lens group 221, a dichroic reflector 222, a prism 223, a second converging and shaping lens group 224, a filter color wheel 225, a light pipe 226, and an optical path turning lens group 227. The first excited phosphor light sequentially passes through the first converging and shaping lens group 221, the dichroic reflector 222, the prism 223, the second converging and shaping lens group 224, and the color filter wheel 225, and enters the light pipe 226. The second excited phosphor light sequentially passes through the optical path turning lens group 227, the prism 223, the second converging and shaping lens group 224, and the color filter wheel 225, and enters the light pipe 226.

The first excited phosphor light excited from the first phosphor layer 20 is reflected by the excitation light reflecting section 11 and then enters the first converging and shaping lens group 221. After the first excited phosphor light is converged and shaped by the first converging and shaping lens group 221, the first excited phosphor light passes through the dichroic reflector 222 and enters the prism. After the first excited phosphor light passes through the prism 223, the first excited phosphor light is converged and shaped by the second converging and shaping lens group 224 again. After the color of the first excited phosphor light is filtered by the color filter wheel 225, the first excited phosphor light finally enters the light pipe 226 for homogenization.

The second excited phosphor light excited from the second phosphor layer 30 passes through the optical path turning lens group 227 where its optical path is changed, and enters the prism 223. The second excited phosphor light is totally reflected by the prism 223 and then enters the second converging and shaping lens group 224. The second excited phosphor light is converged and shaped by the second converging and shaping lens group 224 again. After the color of the first excited phosphor light is filtered by the color filter wheel, the first excited phosphor light finally enters the light pipe 226 for homogenization.

For example, the first converging and shaping lens group 221 includes a first plano-convex lens 2211 and a first biconvex lens 2212, and the second converging and shaping lens group 224 is a second biconvex lens 2241. The first fluorescent light excited from the first fluorescent powder layer 20 is reflected by the excitation light reflecting region 11, passes through the first plano-convex lens 2211, the first biconvex lens 2212, the dichroic mirror 222, the second biconvex lens 2241, and the color filter wheel 225 in sequence, and finally enters the light pipe 226.

For example, the optical path turning lens group 227 includes a second plano-convex lens 2271, a third biconvex lens 2272, a third reflector 2273, a fourth reflector 2274, and a fourth biconvex lens 2275. The second excited phosphor light excited from the second phosphor layer 30 sequentially passes through the second plano-convex lens 2271, the third biconvex lens 2272, the third reflector 2273, the fourth reflector 2274, the fourth biconvex lens 2275, the prism 223, and the second biconvex lens 2271, the biconvex lens 2241, the color filter wheel 225, and enters the light pipe 226.

In this embodiment, the light source module 200 further includes an entrance optical system 230. The entrance optical system 230 includes a focusing and collimating lens group 231 and a diffusing sheet 232. The excitation light emitted by the first light source 210 sequentially passes through the focusing and collimating lens group 231 and diffusing sheet 232, the dichroic reflector 222, and the first converging and shaping lens group 221, and irradiates the phosphor wheel 100.

The blue laser emitted by the first light source 210 is focused and collimated by the focusing and collimating lens group 231 and then homogenized by the diffusing sheet 232, passes through the dichroic reflector 222, enters the first converging and shaping lens group 221 by which it is converged and shaped. After the blur laser is converged by the first converging and shaping lens group 221, a light spot of a suitable size can be obtained. The size of the light spot can be twice the optimal light spot, half of the light spot is focused on the first phosphor layer 20, and the other half of the light spot is focused on the second phosphor layer 30.

For example, the focusing and collimating lens group 231 includes a third plano-convex lens 2311 and a plano-concave lens 2312. The blue laser emitted by the first light source sequentially passes through the third plano-convex lens 2311, the plano-concave lens 2312, the diffusing sheet 232, the dichroic reflector 222, the first plano-convex lens 2211, and the first biconvex lens 2212, and irradiates the phosphor wheel 100.

Figure 9:
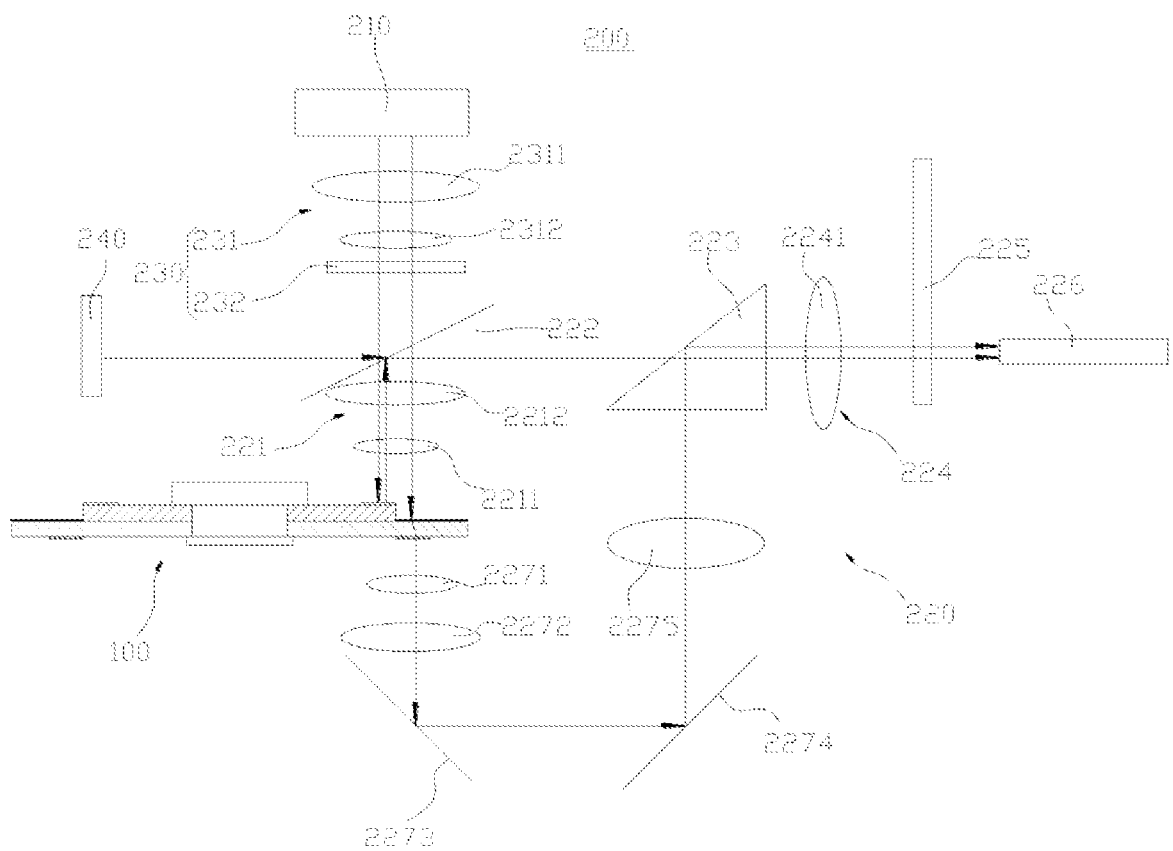
FIG. 9 is a first possible schematic structural diagram of a light source module according to Embodiment 5 of the present application.

As shown in FIG. 9, the phosphor wheel 100 in the light source module 200 is the phosphor wheel 100 according to Embodiment 1 or Embodiment 2. In the phosphor wheel 100 of this structure, the first light source 210 emits blue laser (excitation light), the reflected light generated after the blue laser irradiates the excitation light reflecting section 11 cannot enter the prism 223 through the dichroic reflector 222, and only the blue laser irradiating the excitation light transmitting section 12 passes through the optical path turning lens group 227 and enters the prism 223.

In this case, a second light source 240 may be provided for light compensation. The excitation light emitted by the second light source 240 has the same color as the excitation light emitted by the first light source 210. That is, the excitation light emitted by the second light source 240 is a blue laser. The blue laser emitted by the second light source 240 sequentially passes through the dichroic reflector 222, the prism 223, the second converging and shaping lens group 224, and the color filter wheel 225, and enters the light pipe 226.

In FIG. 9, the characteristic of the dichroic reflector 222 is blue light-transmitting and phosphor light-reflecting. After the blue laser emitted by the first light source 210 is focused and collimated by the focusing and collimating lens group 231, it is homogenized by the diffusing sheet 232, then passes through the dichroic reflector 222 and enters the first converging and shaping lens group 221. After the blue laser excites the first phosphor layer, the first excited phosphor light reflected by the excitation light reflecting section 11 of the phosphor wheel 100 enters the prism 223 after being reflected by the dichroic reflector 222.

Figure 10:
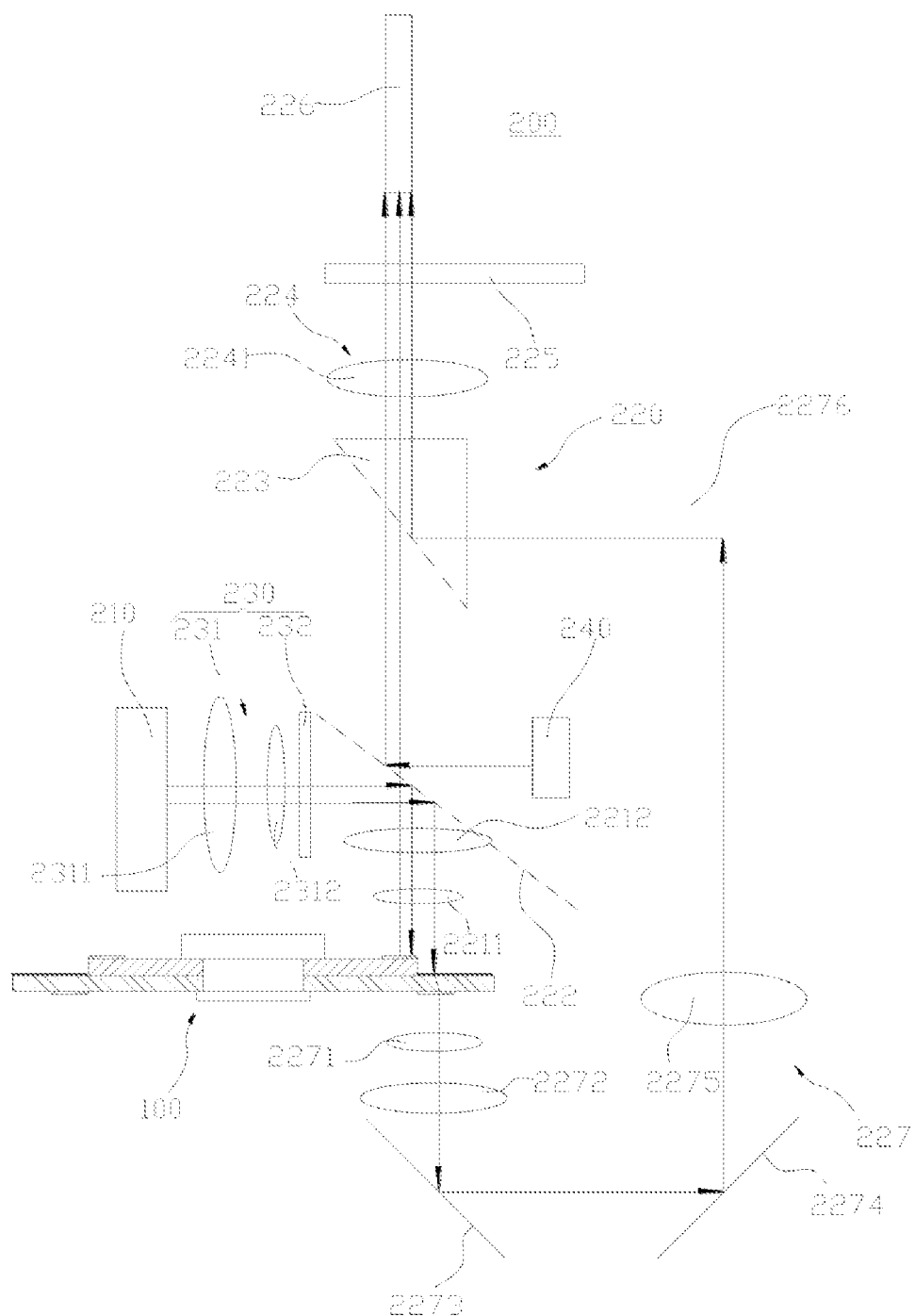
FIG. 10 is a second possible schematic structural diagram of a light source module according to Embodiment 5 of the present application.

Of course, the characteristic of the dichroic reflector 222 may be excited phosphor light-transmitting and blue light-reflecting. As shown in FIG. 10, after the blue laser emitted by the first light source 210 is focused and collimated by the focusing and collimating lens group 231, it is homogenized by the diffusing sheet 232 and reflected by the dichroic reflector 222, and enters the first converging and shaping lens group 221. After the blue laser excites the first phosphor layer, the first excited phosphor light reflected by the excitation light reflecting section 11 of the phosphor wheel 100 passes through the dichroic reflector 222 and enters the prism 223.

In this case, the optical path turning lens group 227 further includes a fifth reflector 2276. The second excited phosphor light excited from the second phosphor layer 30 sequentially passes through the second plano-convex lens 2271, the third biconvex lens 2272, the third reflector 2273, the fourth reflector 2274, the fourth biconvex lens 2275, the fifth reflector 2276, the prism 223, and the second biconvex lens 2271, the biconvex lens 2241, the color filter wheel 225, and enters the light pipe 226.

In addition to performing blue light compensation by adding the second light source 240, blue light compensation may also be performed by other manners.

Figure 11:
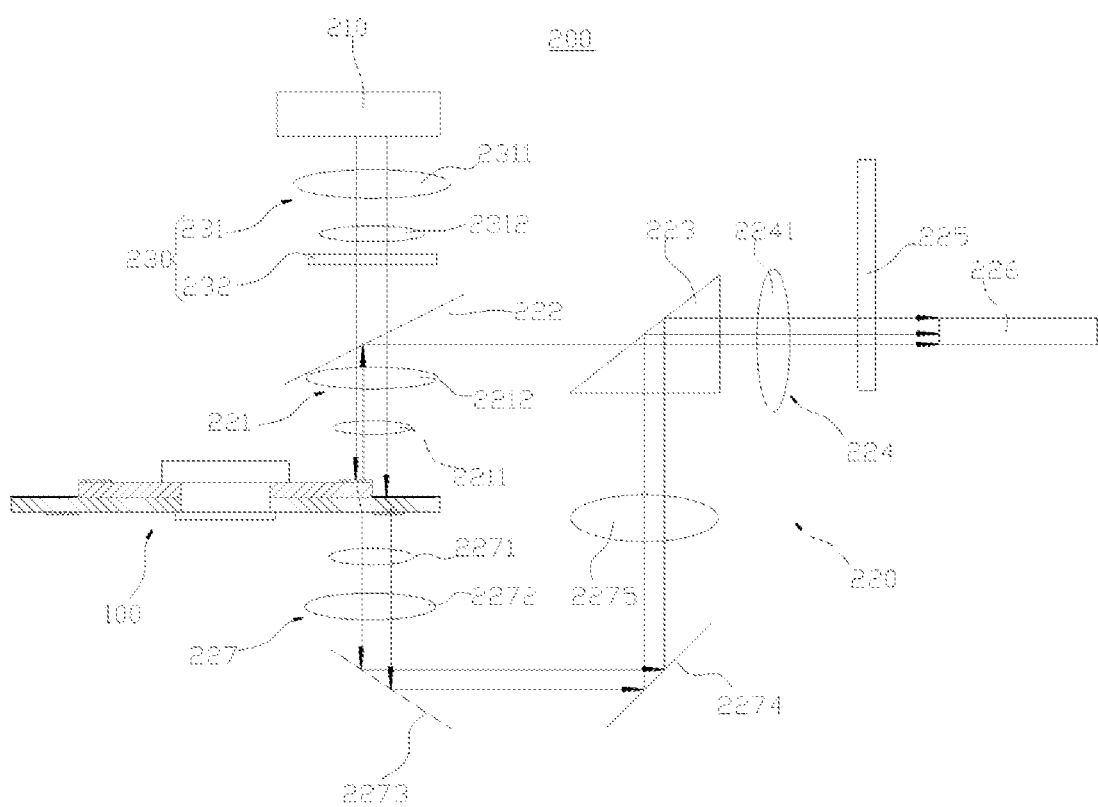
FIG. 11 is a third possible schematic structural diagram of a light source module according to Embodiment 5 of the present application.

As shown in FIG. 11, the phosphor wheel 100 in the light source module 200 is the phosphor wheel 100 according to Embodiment 3, and the laser reflecting region of the phosphor wheel 100 is provided with the transmitting portion 111.

During the rotation of the phosphor wheel 100, the blue laser that excites the first phosphor layer 20 can intermittently pass through the transmitting portion 111, and the excitation light passing through the transmitting portion 111 passes through the optical path turning lens group 227 and enters the prism 223 for blue light compensation.

Figure 12:
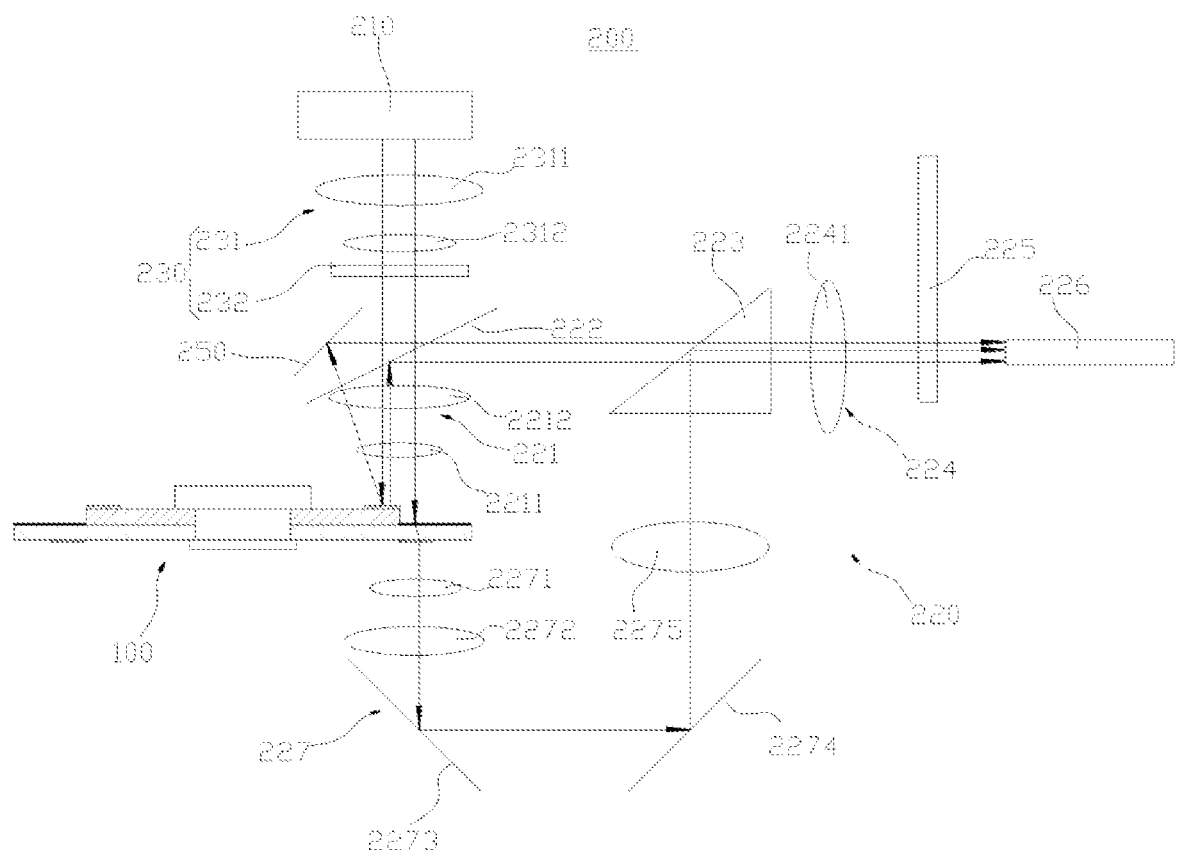
FIG. 12 is a fourth possible schematic structural diagram of a light source module according to Embodiment 5 of the present application.

As shown in FIG. 12, the phosphor wheel 100 in the light source module 200 is the phosphor wheel 100 according to Embodiment 4, and the excitation light reflecting section 11 of the phosphor wheel 100 is provided with a reflecting structure 112. In addition, the light source module further includes the second reflector 250. The reflected light generated when a part of the excitation light emitted by the first light source 210 irradiates the reflecting structure 112 sequentially passes through the second reflector 250, the dichroic reflector 222, the prism 223, the second converging and shaping lens group 224, and the color filter wheel 225, and enters the light pipe 226.

During the rotation of the phosphor wheel 100, the blue laser that excites the first phosphor layer 20 may intermittently irradiate the reflecting structure 112. The blue laser is reflected by the reflecting structure 112 and then sequentially passes through the dichroic reflector 222, the prism 223, and the second converging and shaping lens group 224, the color filter wheel 225, and enters the light pipe 226 for blue light compensation.

Figure 13:
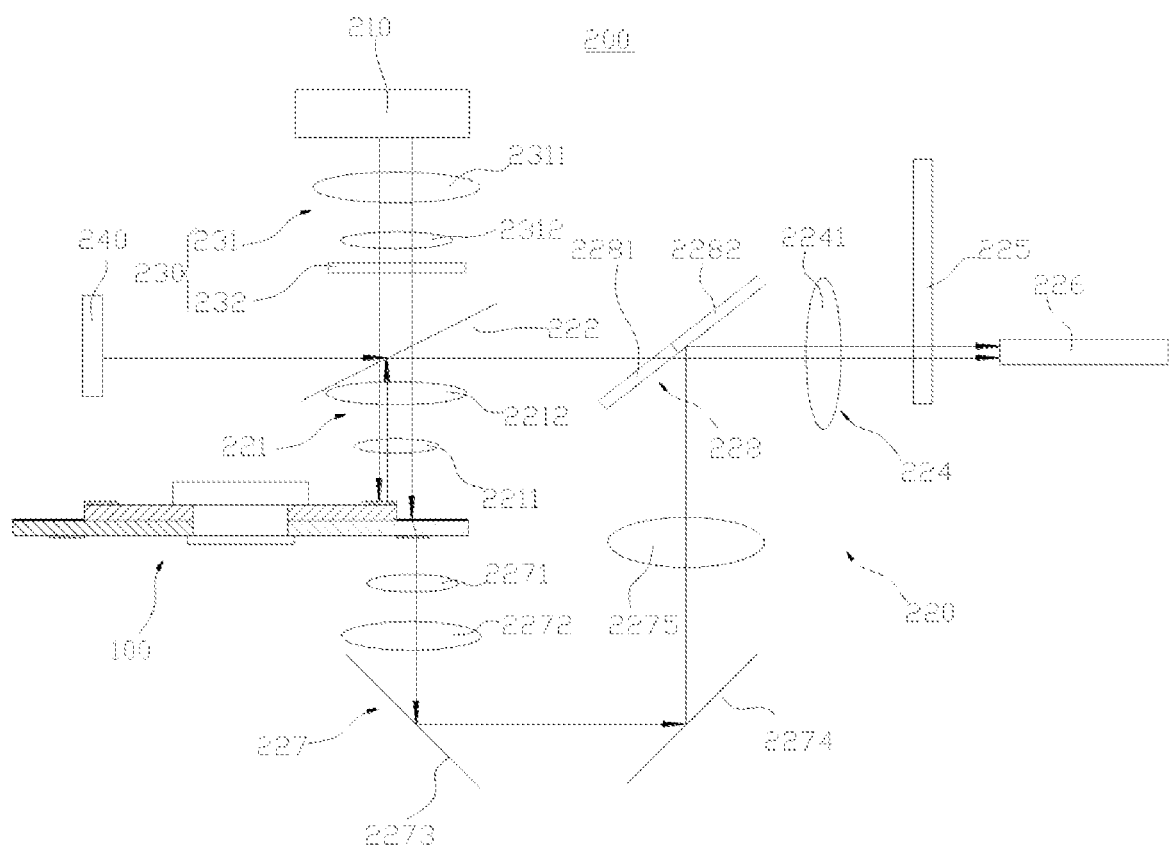
FIG. 13 is a fifth possible schematic structural diagram of a light source module according to Embodiment 5 of the present application.

It should be noted that, in the above-mentioned light combining system 220, the prism 223 may also be replaced with other lenses, such as a reflector 228. As shown in FIG. 13, the reflector 228 includes a transmitting film 2281 and a reflecting film 2282. The first excited phosphor light passes through the transmitting film 2281 and enters the second converging and shaping lens group 224. The second excited phosphor light is reflected by the reflecting film 2282 and enters the second converging and shaping lens group 224.

Embodiment 6

This embodiment provides a projector, including any one of the possible light source modules 200 according to Embodiment 5. Other structures in the projector than the light source module 200 can be referred to the related arts, which will not be detailed here.

The above embodiments are only preferred embodiments of the present application, and are not intended to limit the present application. For those skilled in the art, various modifications and changes can be made to the present application. Any modification, equivalent replacement and improvement made within the gist and principle of the present application shall be included in the protection scope of the present application.

What is claimed is:

1. A phosphor wheel, comprising:
   a base comprising an excitation light reflecting section and an excitation light transmitting section;
   a first phosphor layer disposed on a surface of the excitation light reflecting section facing a direction of incident light and spreading along a circumferential direction of the base; and
   a second phosphor layer disposed on a surface of the excitation light transmitting section facing away from the direction of incident light and spreading along the circumferential direction of the base;
   wherein the first phosphor layer and the second phosphor layer are offset to each other in a radial direction of the base,
   the base comprises a reflecting layer and a transmitting layer, wherein,
      the reflecting layer and the transmitting layer are stacked, a portion of the transmitting layer covered by the reflecting layer is the excitation light reflecting section or the reflecting layer is the excitation light reflecting section, and a portion of the transmitting layer not covered by the reflecting layer is the excitation light transmitting section; or
      the transmitting layer is ring-shaped, the transmitting layer is sleeved on an outer periphery of the reflecting layer, the reflecting layer is the excitation light reflecting section, and the transmitting layer is the excitation light transmitting section,
   a filter layer is disposed on the transmitting layer, the filter layer is configured to transmit excitation light and reflect phosphor light excited from the second phosphor layer,
   a projection area of the second phosphor layer in an axial direction of the phosphor wheel is contained in the filter layer.

2. The phosphor wheel according to claim 1, wherein the transmitting layer extends beyond an edge of the reflecting layer, and the second phosphor layer is disposed on a portion of the transmitting layer extending beyond the reflecting layer.

3. The phosphor wheel according to claim 1, wherein the filter layer is a coating filter disposed on the transmitting layer.

4. The phosphor wheel according to claim 1, wherein a spread path of the first phosphor layer and a spread path of the second phosphor layer are both ring-shaped, the first phosphor layer and the second phosphor layer are coaxially disposed, and an outer diameter of the first phosphor layer is equal to an inner diameter of the second phosphor layer.

5. A light source module comprising a first light source, a light combining system, and a phosphor wheel;
- wherein the phosphor wheel comprises a base, a first phosphor layer, and a second phosphor layer, the base comprises an excitation light reflecting section and an excitation light transmitting section, the first phosphor layer is disposed on a surface of the excitation light reflecting section facing a direction of incident light and spreads along a circumferential direction of the base, the second phosphor layer is disposed on a surface of the excitation light transmitting section facing away from the direction of incident light and spreads along the circumferential direction of the base, and the first phosphor layer and the second phosphor layer are offset to each other in a radial direction of the base;
- a part of excitation light emitted by the first light source irradiates the first phosphor layer and excites first excited phosphor light, and a part of the excitation light emitted by the first light source passes through the excitation light transmitting section, irradiates the second phosphor layer and excites second excited phosphor light; and
- the light combining system is configured to combine the first excited phosphor light and the second excited phosphor light,
- wherein the base comprises a reflecting layer and a transmitting layer, wherein,
  - the reflecting layer and the transmitting layer are stacked, a portion of the transmitting layer covered by the reflecting layer is the excitation light reflecting section or the reflecting layer is the excitation light reflecting section, and a portion of the transmitting layer not covered by the reflecting layer is the excitation light transmitting section; or
  - the transmitting layer is ring-shaped, the transmitting layer is sleeved on an outer periphery of the reflecting layer, the reflecting layer is the excitation light reflecting section, and the transmitting layer is the excitation light transmitting section,
- a filter layer is disposed on the transmitting layer, the filter layer is configured to transmit excitation light and reflect phosphor light excited from the second phosphor layer,
- a projection area of the second phosphor layer in an axial direction of the phosphor wheel is contained in the filter layer.

6. A projector comprising the light source module according to claim 5.

* * * * *